US012684571B2

(12) United States Patent
Elshafie et al.

(10) Patent No.: US 12,684,571 B2
(45) Date of Patent: Jul. 14, 2026

(54) CONSIDERATIONS FOR OVERLAP BETWEEN DATA AND ENERGY HARVESTING

(71) Applicant: QUALCOMM Incorporated, San Diego, CA (US)

(72) Inventors: Ahmed Elshafie, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 733 days.

(21) Appl. No.: 17/817,212

(22) Filed: Aug. 3, 2022

(65) Prior Publication Data

US 2024/0049226 A1 Feb. 8, 2024

(51) Int. Cl.
*H04W 72/1273* (2023.01)
*H04L 1/00* (2006.01)
*H04W 72/23* (2023.01)

(52) U.S. Cl.
CPC ....... *H04W 72/1273* (2013.01); *H04L 1/0003* (2013.01); *H04W 72/23* (2023.01)

(58) Field of Classification Search
CPC ............. H04W 72/1273; H04W 72/23; H04W 52/0216; H04L 1/0003; H04L 1/0009; H04L 1/0015
See application file for complete search history.

(56) References Cited

U.S. PATENT DOCUMENTS

| | | | | |
|---|---|---|---|---|
| 2014/0376424 A1* | 12/2014 | Seo | ........................ | H04L 5/0057 370/280 |
| 2015/0249974 A1* | 9/2015 | Lee | .................... | H04W 72/0446 370/329 |
| 2015/0256316 A1* | 9/2015 | Seo | ........................ | H04W 76/27 370/329 |
| 2015/0365928 A1* | 12/2015 | Lee | ..................... | H04W 72/044 370/329 |
| 2017/0289733 A1* | 10/2017 | Rajagopal | ............. | H04L 5/0082 |
| 2020/0221310 A1* | 7/2020 | Babaei | .................. | H04L 1/1671 |
| 2020/0229227 A1* | 7/2020 | Babaei | ................. | H04W 76/11 |
| 2020/0260486 A1* | 8/2020 | Zhou | ..................... | H04L 1/1835 |
| 2020/0267597 A1* | 8/2020 | Huang | .................. | H04L 1/1812 |
| 2020/0314889 A1* | 10/2020 | Cirik | ..................... | H04W 72/23 |
| 2021/0022091 A1* | 1/2021 | Li | ........................ | H04W 52/242 |
| 2022/0131673 A1 | 4/2022 | Huang et al. | | |
| 2022/0225402 A1* | 7/2022 | Elkotby | .............. | H04W 74/004 |

(Continued)

OTHER PUBLICATIONS

International Search Report and Written Opinion—PCT/US2023/070958—ISA/EPO—Nov. 6, 2023.

(Continued)

*Primary Examiner* — Robert C Scheibel
*Assistant Examiner* — Sang C Lee
(74) *Attorney, Agent, or Firm* — QUALCOMM Incorporated

(57) ABSTRACT

Certain aspects of the present disclosure provide techniques for of wireless communication by a user equipment (UE), generally including detecting a semi-persistently scheduled (SPS) physical downlink shared channel (PDSCH) occasion overlaps with a time period associated with energy harvesting (EH) and processing the SPS PDSCH occasion in a manner determined based on the overlap.

28 Claims, 16 Drawing Sheets

A method of wireless communication by a UE

Detect a periodic transmission occasion overlaps with a time period associated with EH ⟍1305

Process the periodic occasion in a manner determined based on the overlap ⟍1310

1300

(56) References Cited

U.S. PATENT DOCUMENTS

| 2023/0057994 | A1* | 2/2023 | Elkotby | .......... | H04W 72/0453 |
| 2023/0140778 | A1 | 5/2023 | Abotabl et al. | | |

OTHER PUBLICATIONS

QUALCOMM: "Email Discussion Summary for [RAN-R18-WS-non-eMBB-Qualcomm]", 3GPP TSG RAN Rel-18 workshop, RWS-210590, 3rd Generation Partnership Project, Mobile Competence Centre, 650, Route Des Lucioles, F-06921 Sophia-Antipolis Cedex, France, vol. RAN WG3, No. Electronic Meeting, Jun. 28, 2021-Jul. 2, 2021, Jun. 25, 2021, XP052029052, pp. 1-146, Sections 5 and 16, p. 116, p. 47, lines 11-16, section 4.

Wang Z., et al., "PPM: Preamble and Postamble-Based Multi-Packet Reception for Green ZigBee Communication", IEEE Transactions on Green Communications and Networking, IEEE, vol. 3, No. 3, Sep. 1, 2019, XP011741793, pp. 817-827, abstract.

Ericsson: "6G—Connecting a Cyber-Physical World", Feb. 2022, pp. 1-31.

Haque T (Inter Digital)., et al., "Air-Interfaces for Ultra-Low Power Communications—Challenges, Solutions and Potential Benefits", Creating the Living Network, 6G Summit, Mar. 2019, Levi, Finland, 26 Pages.

Huawei: "Green 5G: Building A Sustainable World", Aug. 2020, 26 Pages.

NTT DOCOMO Inc: "White Paper 5G Evolution and 6G", Jan. 2020, pp. 1-17.

Viswanathan H (Nokia)., et al., "Communications in the 6G Era", IEEE Access, Mar. 2020, vol. 8, 19 Pages.

* cited by examiner

900

904
UE

902
Network Entity

SPS Configuration

DCI (Activate SPS)

SPS Overlapping with EH time period

Process SPS occasion that overlaps EH time period using a first MCS value

SPS

Process non-overlapping SPS using a second MCS value (> first MCS value)

SPS

SPS Non-overlapping with EH time period

A method of wireless communication by a UE

Detect a periodic transmission occasion overlaps with a time period associated with EH ⟍1305

Process the periodic occasion in a manner determined based on the overlap ⟍1310

1300

A method of wireless communication by a network entity

Detect a periodic transmission occasion for a UE overlaps with a time period associated with EH    1405

Process the periodic transmission occasion in a manner determined based on the overlap    1410

1400

CONSIDERATIONS FOR OVERLAP BETWEEN DATA AND ENERGY HARVESTING

BACKGROUND

Field of the Disclosure

Aspects of the present disclosure relate to wireless communications, and more particularly, to techniques for processing data transmissions that overlap with energy harvesting (EH) opportunities.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes detecting a periodic transmission (e.g., downlink semi-persistence scheduling or uplink configured grant or configured grant) occasion overlaps with a time period associated with energy harvesting (EH); and processing the periodic transmission occasion in a manner determined based on the overlap.

Another aspect provides a method of wireless communication by a network entity. The method includes detecting a periodic transmission occasion for a UE overlaps with a time period associated with EH; and processing the periodic transmission occasion in a manner determined based on the overlap.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
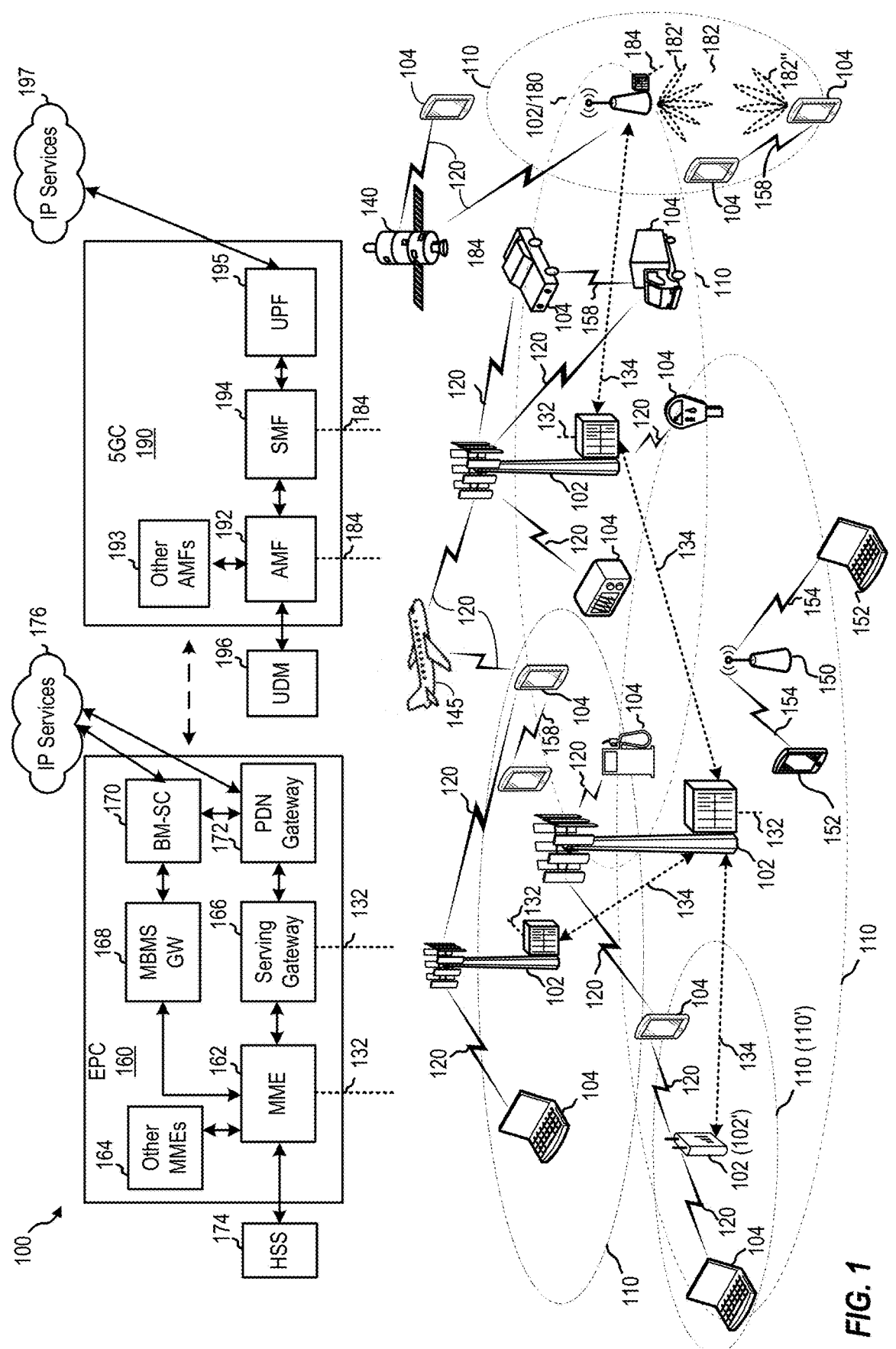
FIG. 1 depicts an example wireless communications network.

Aspects of the present disclosure provide apparatuses, methods, processing systems, and computer-readable mediums for processing data transmissions that overlap with energy harvesting (EH) opportunities.

A new generation of wireless devices may overcome conventional limitations of on-board energy storage by harvesting energy from wireless signals (e.g., radio frequency (RF) signals) to perform wireless communications. Such energy harvesting devices may include, for example, user equipments (UEs) and various other types of devices, such as radio frequency identification (RFID) devices (e.g., RFID tags). Energy-harvesting devices may be considered a type of user equipment (UE) that provides low-cost and low-power solutions for many applications in a wireless communications system.

In some use cases, the main purpose of harvesting energy is to be used in tasks like data decoding, data reception, data encoding, and data transmission. The EH device can have limited energy storage unit to store the harvested energy, and the stored energy may be used to perform data decoding, encoding, filtering, processing, and the like. In other cases, the purpose is not to charge a phone battery in full but to charge the battery of a device (such as a wearable, smart watch, or UE with very low power or use a dedicated battery for EH) in a way that enables some tasks to be performed using the harvested energy. Various tasks such as data decoding, operating some filters, data encoding, transmitting, or receiving data may be done through accumulation of energy harvested over time. In some cases, the EH mode of operation can occur when a battery of a UE (e.g., a phone) is at critically low levels and energy harvesting modes can be used. In some cases, the EH module can work at very low power modes by the UE or when the UE decides to use such low power saving mode. This can be based on a request for the EH mode of operation requested from UE to NW.

In some cases, EH may refer to a plurality of EH techniques/schemes that would be implemented by an EH device. Examples of these EH techniques/schemes may include radio-frequency (RF) EH, light/laser EH, and solar EH. In some cases, EH in this disclosure refers to any wireless EH technique(s) that can be provided from one device (e.g., gNB) to an EH device (e.g., UE), such as RF and laser (using a laser beam). Nevertheless, the ideas can be applicable to other forms of wireless charging/transfer that could be supported from one device to another.

A network deploying devices (nodes) capable of operating in this manner may be referred to as a self-sustainable network. This is because the nodes can interact in the network through the energy harvested through transmissions. In some cases, semi-persistently scheduled (SPS) EH occasions (periods of time) may be allocated to EH, which may help ensure a device has sufficient opportunities to harvest energy. One potential issue, however, is that such SPS EH occasions may overlap with SPS data occasions. In the event a power splitter is used for EH purposes, SPS data processing may be impacted by energy harvesting. For example, the effective signal to interference and noise ratio (SINR) of the SPS data may be different (lower) when EH is being performed than when EH is not being performed.

Aspects of the present disclosure, however, provide processing techniques that may account for the overlap of SPS data and EH occasions. For example, in some cases, a different (lower) modulation and coding scheme (MCS) may be used when SPS data occasions overlap with EH occasions. By adjusting MCS to account for overlap between SPS data and EH occasions, data may be more reliably decoded and overall performance may be improved.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
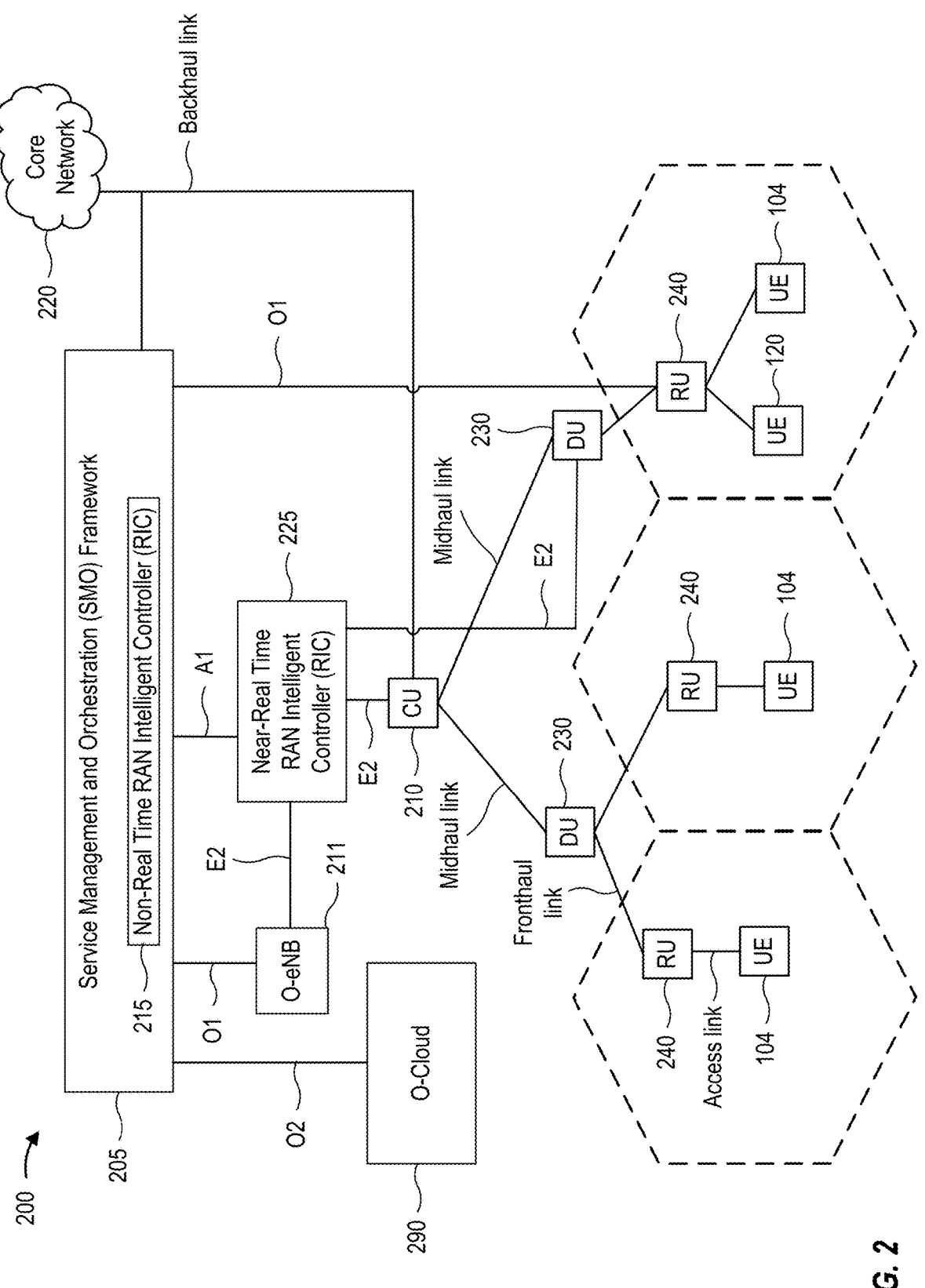
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
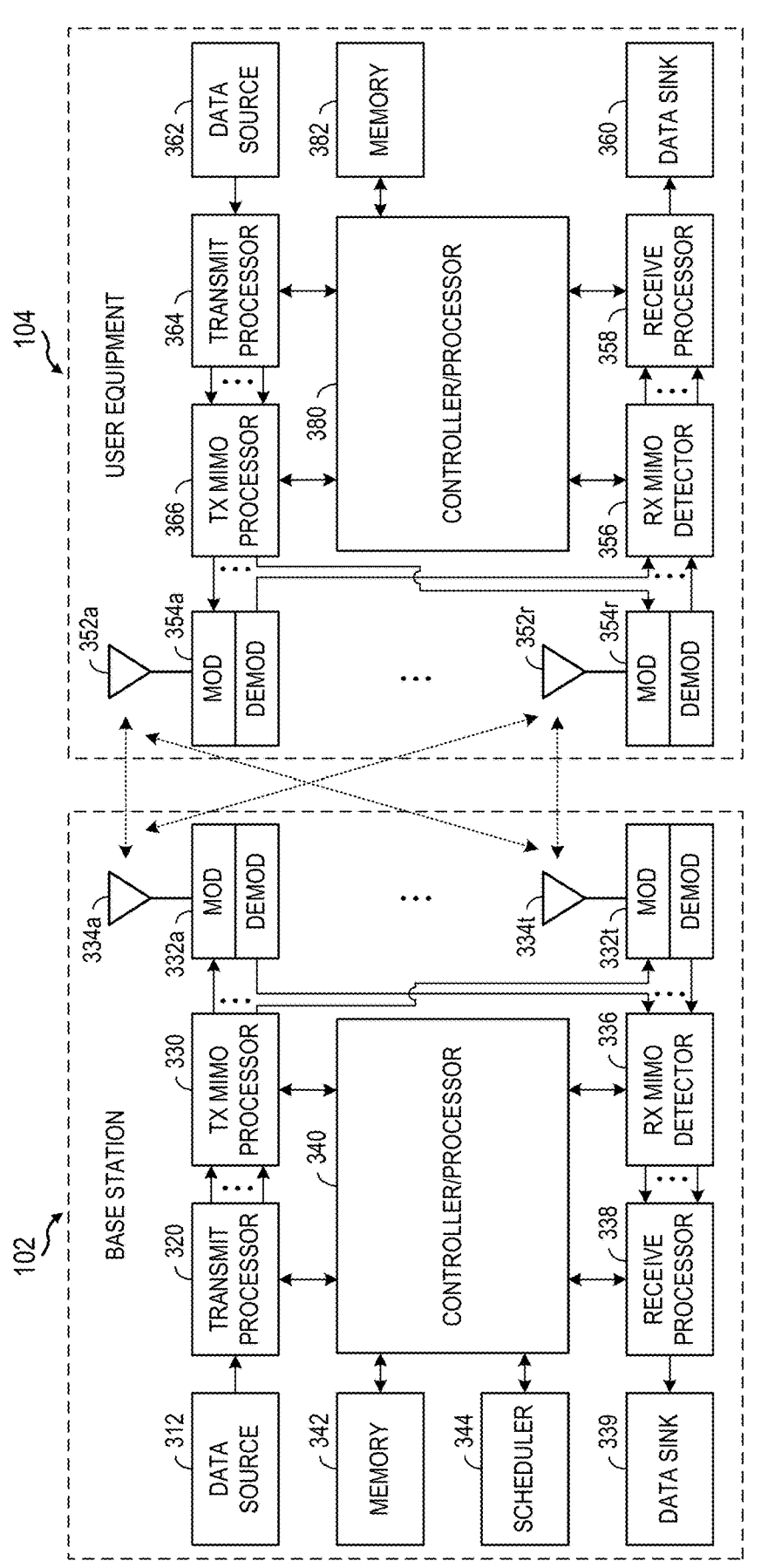
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a-*332*t*. Each modulator in transceivers 332*a-*332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a-*332*t* may be transmitted via the antennas 334*a-*334*t*, respectively.

In order to receive the downlink transmission, UE 104 includes antennas 352*a-*352*r* that may receive the downlink signals from the BS 102 and may provide received signals to the demodulators (DEMODs) in transceivers 354*a-*354*r*, respectively. Each demodulator in transceivers 354*a-*354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a-*354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a-*354*r* (e.g., for SC-FDM), and transmitted to BS 102.

At BS 102, the uplink signals from UE 104 may be received by antennas 334*a-t*, processed by the demodulators in transceivers 332*a-*332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
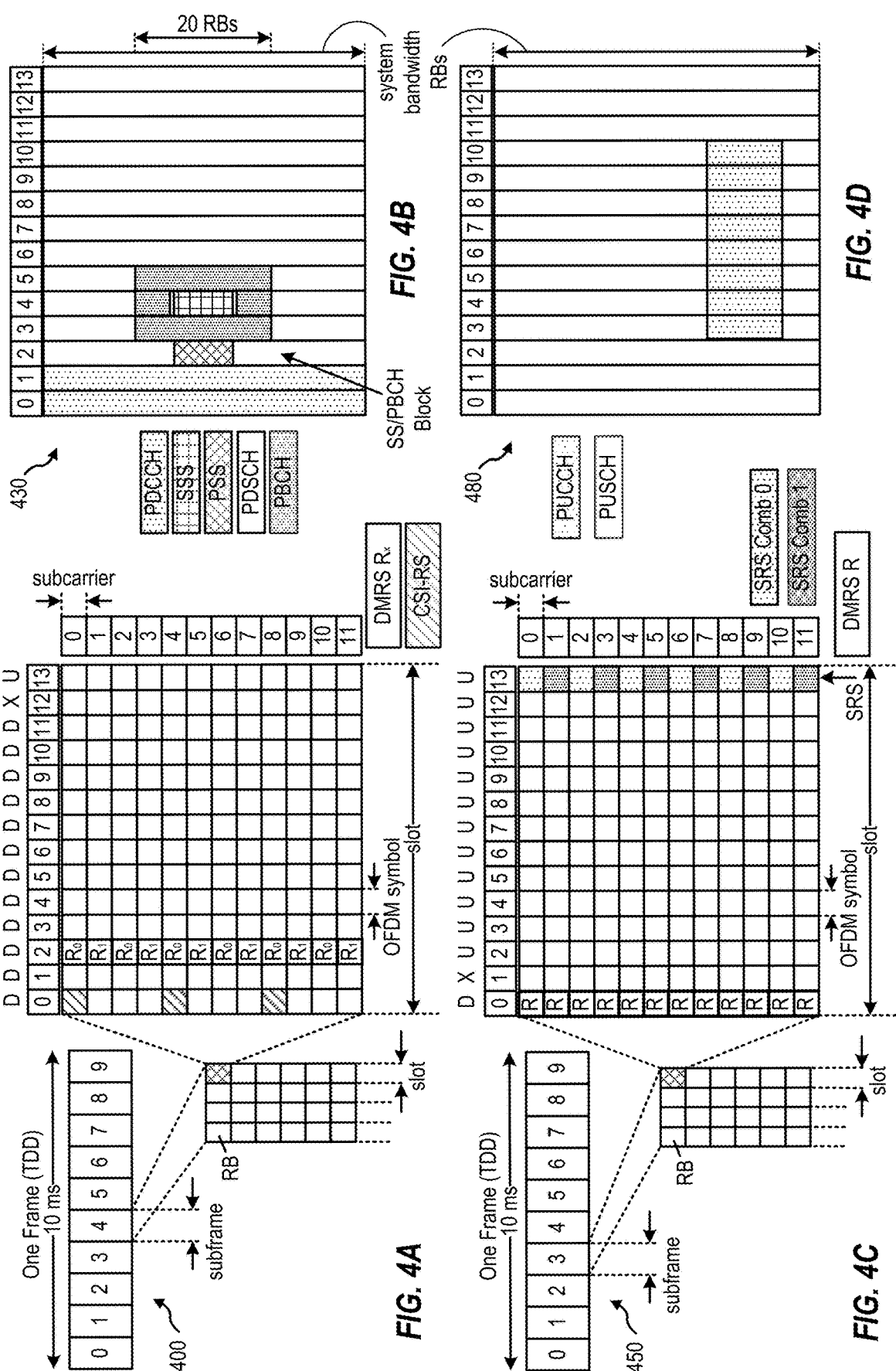
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram

450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of sub carriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Energy Harvesting

UEs capable of energy harvesting (EH) are part of a rapidly growing technology impacting many industries due to their economic potential for inventory/asset management within warehouses, internet of things (IoT), sustainable sensor networks in factories and/or agriculture, and smart homes, to name a few example applications.

Certain types of UEs may be operated without a battery. Generally, UEs that are operated without a battery are known as passive devices. Examples of passive devices include passive RFID devices that operate by harvesting energy from received radio frequency signals (e.g., "over the air"), thereby powering reception and transmission circuitry within the devices. This harvested energy allows passive devices to transmit information, sometimes referred to as backscatter modulated information, without the need for a local power source within the device.

Figure 5:
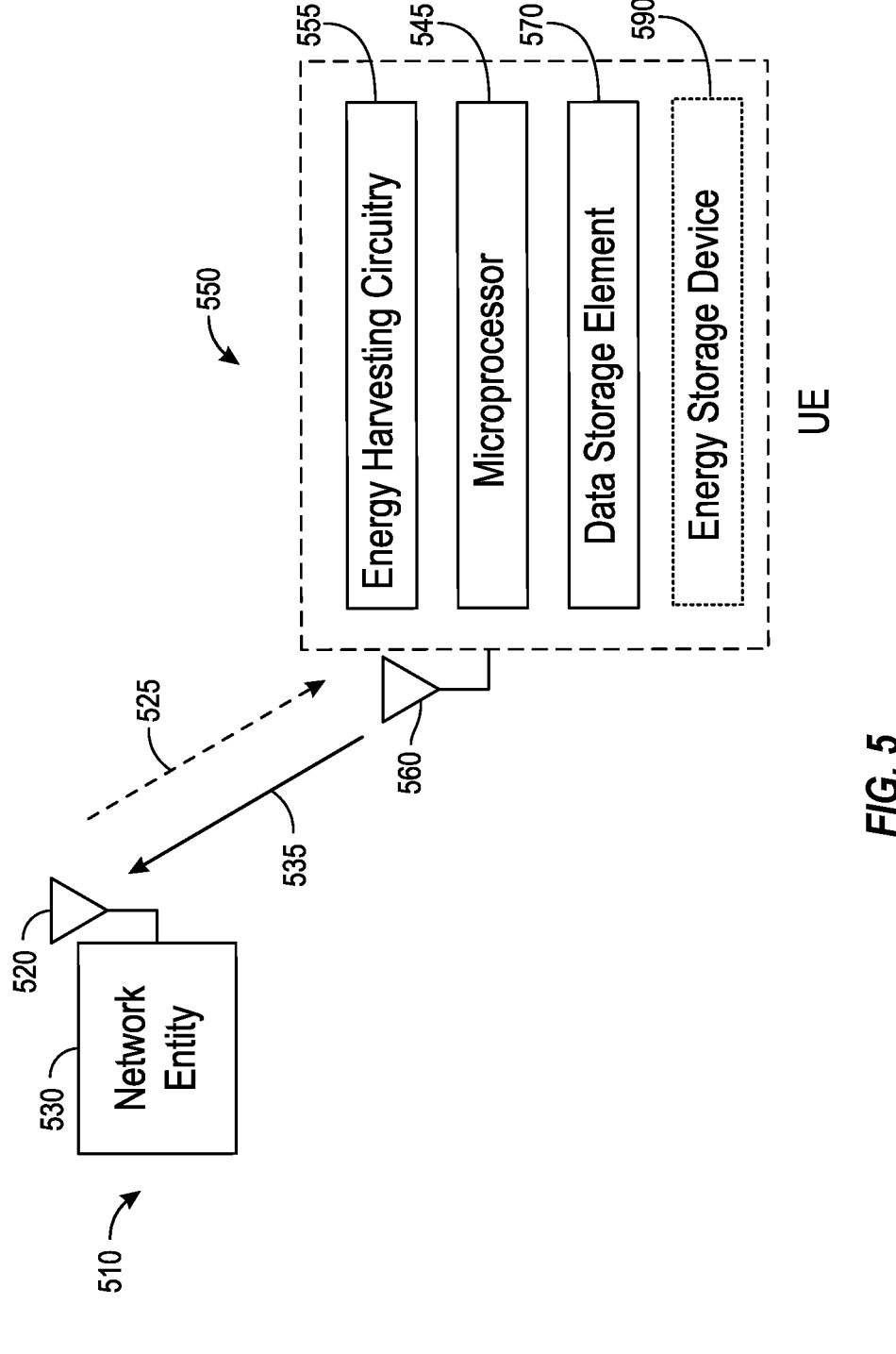
FIG. 5 illustrates an example energy harvesting scenario.

In other cases, as illustrated in FIG. 5, UEs may be semi-passive and include on-board energy storage to supplement their ability to harvest energy from received signals (however, at higher cost).

In certain aspects, in addition to harvesting power from RF sources, energy harvesting devices may accumulate energy from other direct energy sources, such as solar energy, in order to supplement its power demands. Semi-passive energy harvesting devices may, in some cases, include power consuming RF components, such as analog to digital converters (ADCs), mixers, and oscillators.

Energy harvesting devices are a type of user equipment that provides low-cost and low-power solutions for many applications in a wireless communications system. Such devices may be very power efficient, sometimes requiring less than 0.1 mW of power to operate. Further, their relatively simple architectures and, in some cases, lack of battery, mean that such devices can be small, lightweight, and easily installed or integrated in many types of environments or host devices. Generally speaking EH capable devices provide practical and necessary solutions to many networking applications that require, low-cost, small footprint, durable, maintenance-free, and long lifespan communications devices. For example, EH capable devices may be configured as long endurance industrial sensors, which mitigates the problems of replacing batteries in and around dangerous machinery.

FIG. 5 shows an example system 500 with a UE 550 configured to harvest energy from RF transmissions 525 from a network entity 510 (e.g., a gNB). In this mode of operation, network entity 510 may also be referred to as an interrogator or a scanner.

Network entity 510 includes an antenna 520 and an electronics unit 530. Antenna 520 radiates signals transmitted by reader 510 and receives signals 5350 from UEs, such as UE 550, and/or other devices. Electronics unit 530 may include a transmitter and a receiver. The same pair of transmitter and receiver (or another pair of transmitter and receiver) may support bi-directional communication with wireless networks, wireless devices, etc. Electronics unit 530 may include processing circuitry (e.g., a processor) to perform processing for data being transmitted and received by the network entity 510.

As shown, UE 550 includes an antenna 560 and a data storage element 570. Antenna 560 radiates signals transmitted by UE 550 and receives signals from network entity 510 and/or other devices. Data storage element 570 stores information for UE 550, for example, in an electrically erasable programmable read-only memory (EEPROM) or another type of memory. UE 550 may also include an electronics unit that can process the received signal and generate the signals to be transmitted.

In certain aspects, UE 550 may be a passive device having no battery. In this case, induction may be used to power the UE 550. For example, in some cases, a magnetic field from a signal transmitted by network entity 510 may induce an electrical current in UE 550, which may then operate based on the induced current. UE 550 can radiate its signal in response to receiving a signal from network entity 510 or some other device. In certain other aspects, UE 550 may optionally include an energy storage device 590, such as a battery, capacitor, etc., for storing energy harvested using energy harvesting circuitry 555, as described below.

Wireless technology is increasingly useful in industrial applications, such as ultra-reliable low-latency communication (URLLC) and machine type communication (MTC). In such domains, and others, it is desirable to support devices (e.g., passive RFID tags) that are capable of harvesting energy from wireless energy sources (e.g., in lieu of or in combination with a battery or other energy storage device, such as a capacitor), such as RF signals, thermal energy, solar energy, and the like.

There are various types of energy-harvesting architectures, including a separated receiver architecture, a time-switching architecture, and a power-splitting architecture. With the separated receiver architecture, one receiver may be used to receive information (data processing), while a separate receiver is used for energy harvesting.

For the time-switching architecture, a node switches between the information receiver and the RF energy harvester. In such cases, the energy harvested at receiver j, from source i, can be calculated as follows:

$$E_j = \eta P_i |g_{i-j}|^2 \alpha T,$$

where $0 \leq \alpha \leq 1$ is the fraction of time allocated for energy harvesting. Letting $\kappa$ and W denote the noise spectral density and channel bandwidth, the data rate may be given as:

$$R_{i-j} = (1 - \alpha) \log_2 \left( 1 + \frac{|g_{i-j}|^2 P_i}{\kappa W} \right).$$

Figure 6:
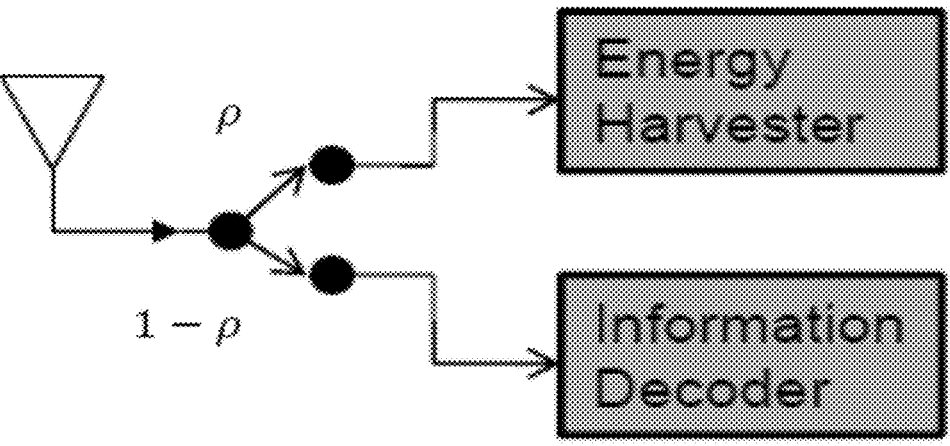
FIG. 6 depicts an example power splitting RF energy harvesting (EH) scheme.

As illustrated in FIG. 6, in the power-splitting architecture, the received RF signals may be split into two streams for the information receiver and RF energy harvester with different power levels. In this case, the energy harvested at receiver j, from source i, can be calculated as:

$$E_j = \eta \rho P_i |g_{i-j}|^2 T,$$

where $0 \leq \rho \leq 1$ is the fraction of power allocated for energy harvesting. In this case, the data rate may be given as:

$$R_{i-j} = \log_2 \left( 1 + \frac{|g_{i-j}|^2 (1 - \rho) P_i}{\kappa W} \right).$$

Example SPS PDSCH Configuration

Semi-persistent scheduling (SPS) resource allocation, which is sometimes called configured downlink assignment, refers to a scheduling technique where a user-equipment (UE) is pre-configured by the network/base station (e.g., eNBs, gNB, etc.) with a periodicity and an offset.

Figure 7:
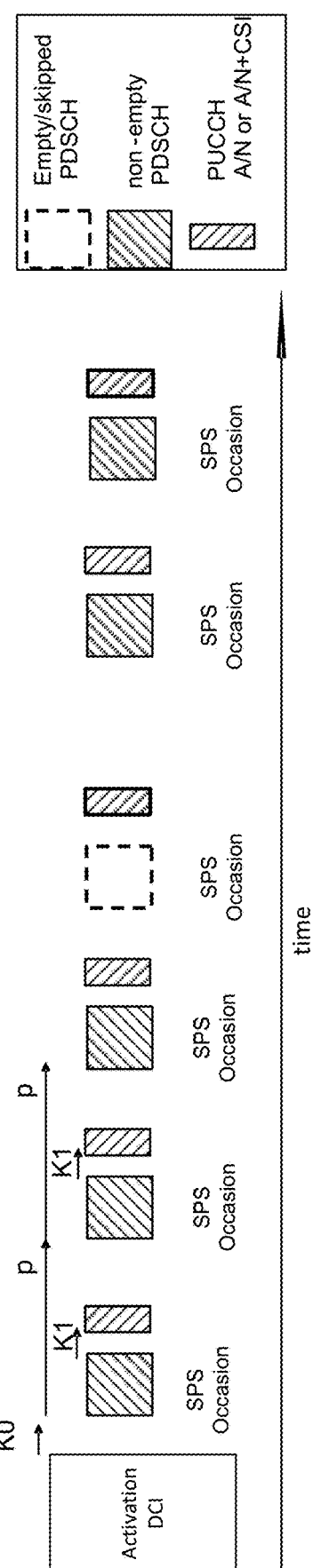
FIG. 7 depicts an example semi-persistent scheduled (SPS) physical downlink shared channel (PDSCH) configuration.

As illustrated in FIG. 7, once pre-configured, if the UE were to receive an allocation of downlink resources, then the allocation of SPS occasions would repeat according to the pre-configured periodicity, p, resulting in periodic SPS occasions. For SPS, the base station may use Radio Resource Control (RRC) signaling to define the periodicity of configured downlink assignments.

As used herein, the term occasion generally refers to a time in which resource are allocated for a transmission that may or may not ultimately happen. For example, a downlink transmission may or may not occur in an SPS occasions. As illustrated, a UE may monitor SPS occasions some time (K0) after an SPS configuration is activated via a downlink control information (DCI). A parameter K1 specifies the PUCCH grant time in time slots to send acknowledgment (HARQ-ACK) feedback after receiving the PDSCH in an SPS occasion.

Figure 8:
FIG. 8 depicts an example of SPS PDSCH activation and release.

For an SPS configuration, radio resource control (RRC) signaling typically configure the SPS periodicity and HARQ-ACK feedback resources. As illustrated in FIG. 8, SPS activation (and/or) reactivation may be triggered via DCI. Similarly, SPS release may also be triggered via DCI. A network entity (e.g., a gNB) may use SPS an activation DCI to activate a certain configured SPS. In the activation DCI, the gNB may indicate transmission (Tx) parameters such as a modulation and coding scheme (MCS), RB allocation, and antenna ports of the SPS transmission. The gNB may use an SPS reactivation DCI to change the Tx parameters (e.g., to change one or more of the MCS, RB allocation, or antenna ports of the SPS).

Example Processing Techniques for Data Transmissions that Overlap with Energy Harvesting (EH) Occasions As noted above, one potential issue with periodic transmission (such as SPS or configured grant data) and EH schemes is that periodic EH occasions may overlap with the periodic data occasions. For example, in the event a power splitter is used for EH purposes (e.g., as shown in FIG. 6), SPS data processing may be impacted by energy harvesting. For example, the effective signal to interference and noise ratio (SINR) of the SPS data may be different (lower) when EH is being performed than when EH is not being performed. The present disclosure refers to SPS data (PDSCH) occasions as an example of a type of periodic transmission occasion, the techniques described herein may be applied to process any type of periodic transmission occasions, including sidelink periodic transmissions between UEs or other types, that overlap with periodically (e.g., SPS/configured grant) or dynamically/a periodically allocated EH occasions.

This may occur, for example, when data SPS is used to allow for certain services, such as voice over IP (VoIP) and periodic transmissions. With a single activation DCI, a train (or series) of PDSCH (Or PUSCH) transmissions can be triggered and used to serve a UE. Aspects of the present disclosure provide techniques that may help account for the case where there is interaction (e.g., overlap) between EH occasions and data SPS occasions.

As will be described in greater detail below, in some cases, an offset/delta for the data MCS may be used. In other words, since the EH UE will use a power splitter, the effective SINR when the EH is ON may be different (and lower) than the effective SINR when the EH is off. Thus, to account for this, the network entity (e.g., gNB) may use a different MCS for data transmissions that overlap with EH occasions. The UE may be signaled an indication of the different MCS.

Figure 9:
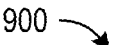
FIG. 9 is a call flow diagram illustrating example signaling between an energy transmitter and an energy receiver, in accordance with aspects of the present disclosure.

The techniques proposed herein may be understood with reference to the call flow diagram 900 shown in FIG. 9, which shows how a UE 904 may process data transmissions from a network entity 902 (e.g., a gNB or node of a disaggregated base station) that occur in SPS occasions that overlap with EH occasions.

As illustrated, the network entity may signal an SPS configuration to the UE. As noted above, the SPS configuration may indicate a periodicity, p, for periodic SPS occasions. Once an SPS is activated (e.g., via DCI), the UE may monitor SPS occasions for data (PDSCH) transmissions.

As illustrated, if the UE detects an SPS PDSCH occasion overlaps with a time period associated with EH, the UE may process the SPS PDSCH occasion in a manner determined based on the overlap. For example, the UE may process SPS PDSCH occasions that overlap in time with a first MCS that is lower than a second MCS used to process SPS PDSCH transmissions that do not overlap with EH operation.

The techniques described herein may account for various cases of overlap. Such cases may include, for example, a first case where data SPS and EH SPS overlap, a second case where data SPS and an EH dynamic grant (DG) overlap, and a third case where data SPS and EH discontinuous reception (DRX) overlap.

In some cases, an SPS PDSCH occasion may be processed with a first set of configuration parameters that are different than a second set of configuration parameters used for processing SPS PDSCH occasions that do not overlap with time periods associated with EH. In some cases, the set of configuration parameters comprises at least one of a modulation and coding scheme (MCS), transmission port, transmission rank, power offset of data channel or demodulation reference signal (DMRS), time-domain resource allocation (TDRA), frequency-domain resource allocation (FDRA), DMRS configuration, or any other parameters that could be provided in L1/L2/L3 signaling and could be adjusted due to the overlap.

Figure 10:
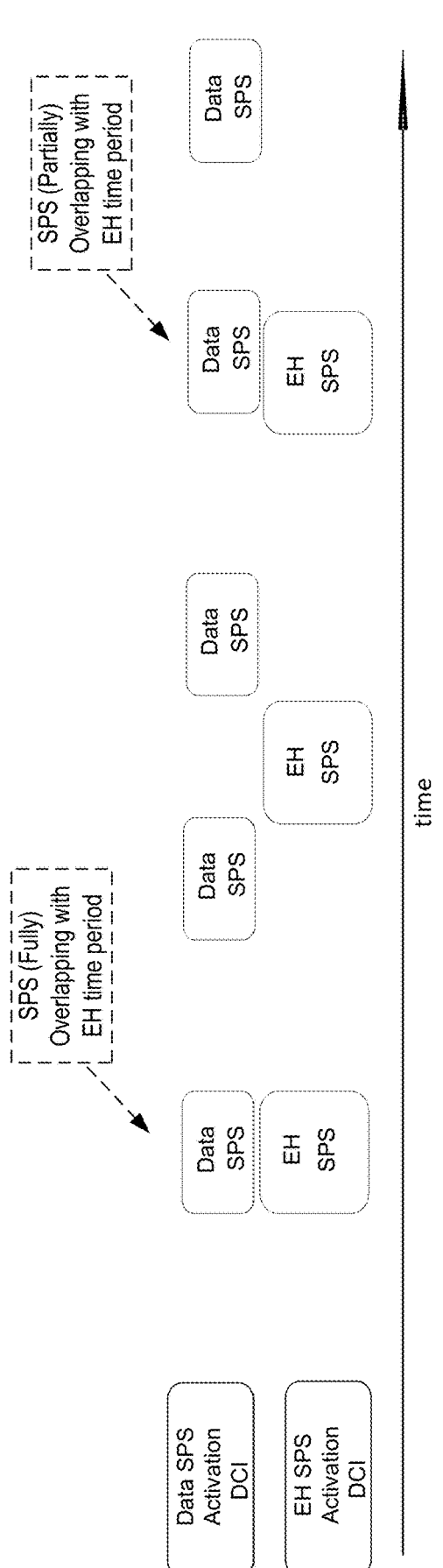
FIG. 10, FIG. 11, and FIG. 12 depict examples of overlap between SPS and EH occasions, in accordance with aspects of the present disclosure.

FIG. 10 illustrates an example of the first case, where data SPS overlaps with EH SPS. As illustrated, in this case, the MCS used for DL while the EH is on may be lower than the cases where there is no overlap between data SPS and EH SPS. In some cases, the amount of overlap could result in a need to send more MCS configuration information. For example, the configuration may indicate a lower MCS to be used when there is some amount of overlap (e.g., based on a number of symbols, #sym, that overlap).

In an SPS RRC configuration, the network entity may indicate an MCS delta (or offset). As an alternative, the network entity may indicate the MCS to use in the overlapping case via RRC or medium access control (MAC) control element (CE) signaling. In some cases, where the overlap is partial, the UE might discard the EH signal. In other words, in this case, the UE may not use the EH signal and may not operate the EH circuit, since that might mean enabling the power splitter which might require some amount of time.

In some cases, the gNB may ask (or instruct) the UE to use two or more different power splitting factors when partial or full allocations happen. For example, the gNB may indicate an MCS to use based on a threshold number of OFDM symbol overlap. The different overlapping scenarios could be associated by two or more MCS values in addition to the value when there is no overlap with EH SPS at all.

Figure 11:
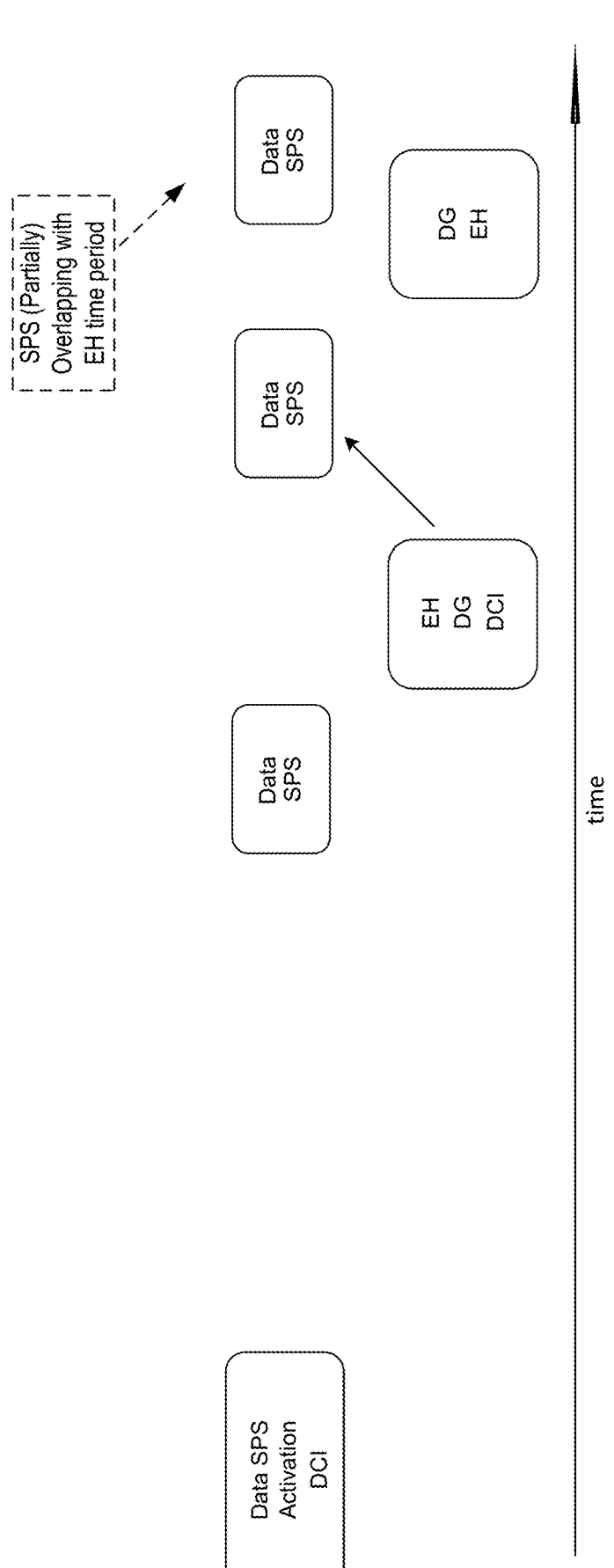

FIG. 11 illustrates an example of the second case, where data SPS overlaps with EH scheduled via a dynamic grant (DG). As illustrated, in this case, the EH DCI may schedule (indicate) one or more EH resource(s)/allocations. The gNB may also indicate the new data MCS used when SPS occasions are overlapping with data. An offset from the original data MCS can be signaled for this purpose.

In general, the MCS could be a function of how much overlap is between the data and EH signals. In some cases, the EH DG reception could be assumed as an indication to cancel the data SPS occasion (though this could be a function of how much symbol overlap is there between the two resources). In some cases, there may be a timeline defined on when the new MCS is effective after receiving the EH DCI. If this timeline is not met in time for a subsequent data SPS, the UE may discard the command and assume the old MCS.

Figure 12:
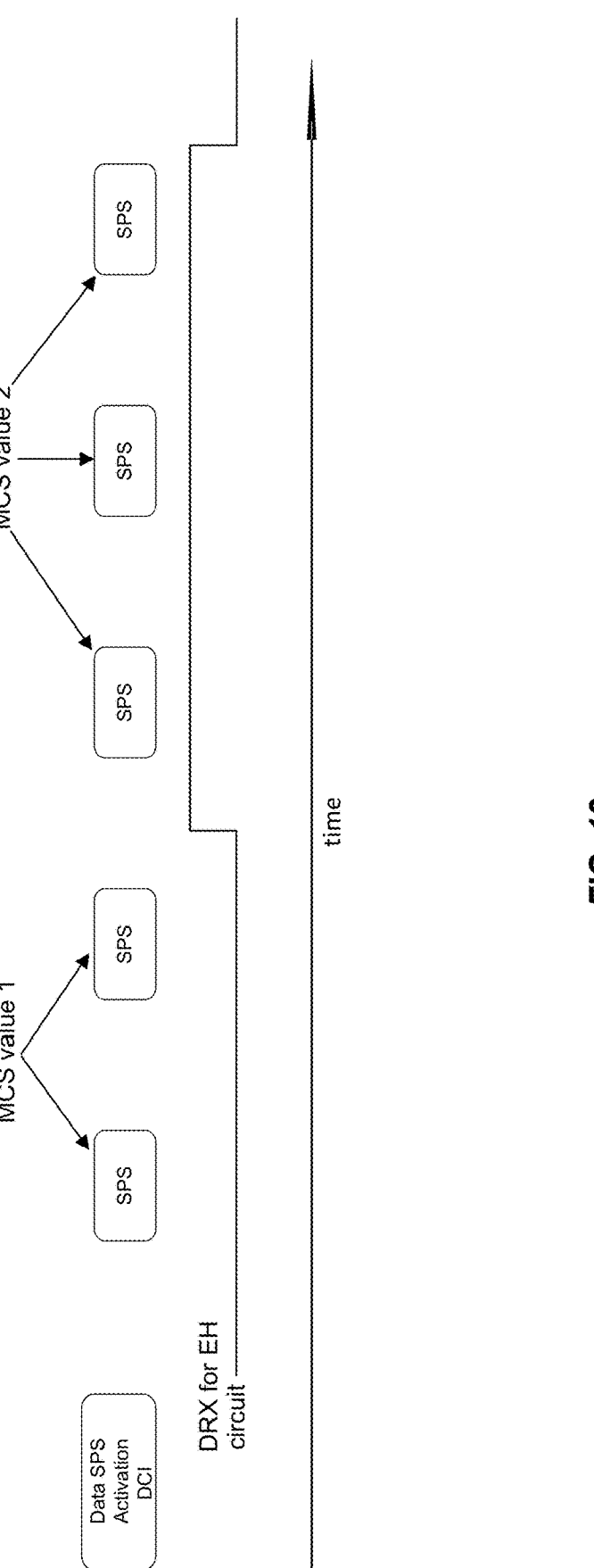

FIG. 12 illustrates an example of the third case, where data SPS overlaps with EH DRX. There are various options for this scenario. For example, according to a first option, the gNB may indicate, in the SPS activation or reactivation DCI, a first MCS (MCS value 1) used if the EH circuit is OFF and a second MCS (MCS value 2) used if the EH circuit is ON. In some cases, an MCS and an offset can be configured.

According to a second option, based on the DRX design used by the UE, the gNB may adjust the data MCS accordingly without explicit signaling in a DCI. In some cases, the gNB may indicate (e.g., via RRC/MAC-CE) the MCS value/delta/offset used with EH circuit being ON or OFF.

According to certain aspects, when the EH circuit is ON, the UE may cancel all SPS occasions and/or any data. In other words, the UE may not be expected to monitor data of one or more SPS configurations or SPS plus DG. According to a first option, the gNB may not transmit any data to UE. According to a second option, the gNB may still transmit this as data or as dedicated/beamformed energy signals. In either case, the UE may harvest energy from the transmission.

Example Operations of a User Equipment

Figure 13:
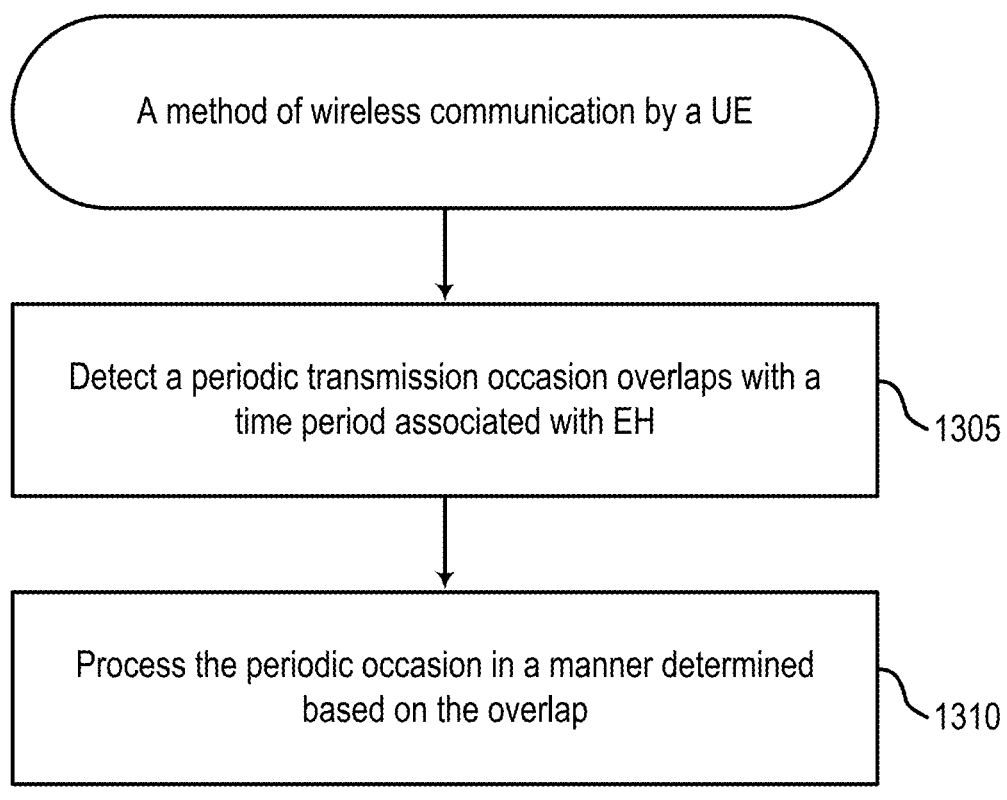
FIG. 13 depicts a method for wireless communications.

FIG. 13 shows an example of a method 1300 of wireless communication by a UE, such as a UE 104 of FIGS. 1 and 3.

Method 1300 begins at step 1305 with detecting a periodic transmission (e.g., SPS PDSCH) occasion overlaps with a time period associated with EH. In some cases, the operations of this step refer to, or may be performed by, circuitry for detecting and/or code for detecting as described with reference to FIG. 15.

Method 1300 then proceeds to step 1310 with processing the periodic transmission occasion in a manner determined based on the overlap. In some cases, the operations of this step refer to, or may be performed by, circuitry for processing and/or code for processing as described with reference to FIG. 15.

In some aspects, the time period associated with EH comprises an SPS EH occasion.

In some aspects, processing the SPS PDSCH occasion in a manner determined based on the overlap comprises: processing the SPS PDSCH occasion with a first MCS that is lower than a second MCS used for processing SPS PDSCH occasions that do not overlap with time periods associated with EH.

In some aspects, the method 1300 further includes determining the first MCS based on an absolute MCS value or an offset MCS value relative to the second MCS. In some cases, the operations of this step refer to, or may be performed by, circuitry for determining and/or code for determining as described with reference to FIG. 15.

In some aspects, the absolute MCS value or offset MCS value is dynamically signaled or configured via RRC signaling.

In some aspects, the UE discards an EH signal while processing the SPS PDSCH occasion.

In some aspects, the UE processes EH signals: using a first power splitting factor for EH time periods that overlap with SPS PDSCH occasions; and using a second power splitting factor for EH time periods that do not overlap with SPS PDSCH occasions.

In some aspects, the time period associated with EH comprises an EH time period scheduled via DCI.

In some aspects, processing the SPS PDSCH occasion in a manner determined based on the overlap comprises processing the SPS PDSCH with a MCS indicated in the DCI.

In some aspects, the SPS PDSCH occasion is processed using the MCS indicated in the DCI only if there is sufficient time between the DCI and the SPS PDSCH occasion.

In some aspects, the SPS PDSCH occasion is canceled only if the overlap is greater than a threshold amount.

In some aspects, processing the SPS PDSCH occasion in a manner determined based on the overlap comprises canceling the SPS PDSCH occasion.

In some aspects, the time period associated with EH comprises a time period that an EH circuit of the UE is active.

In some aspects, processing the SPS PDSCH occasion in a manner determined based on the overlap comprises: processing the SPS PDSCH with a first MCS when the EH circuit is active that is lower than a second MCS used for processing SPS PDSCH occasions when the EH circuit is not active.

In some aspects, the first MCS and second MCS are indicated via a DCI that activates or reactivates SPS.

In some aspects, the first MCS and second MCS are indicated via RRC or MAC-CE signaling.

In some aspects, processing the SPS PDSCH occasion in a manner determined based on the overlap comprises canceling the SPS PDSCH occasion.

Figure 15:
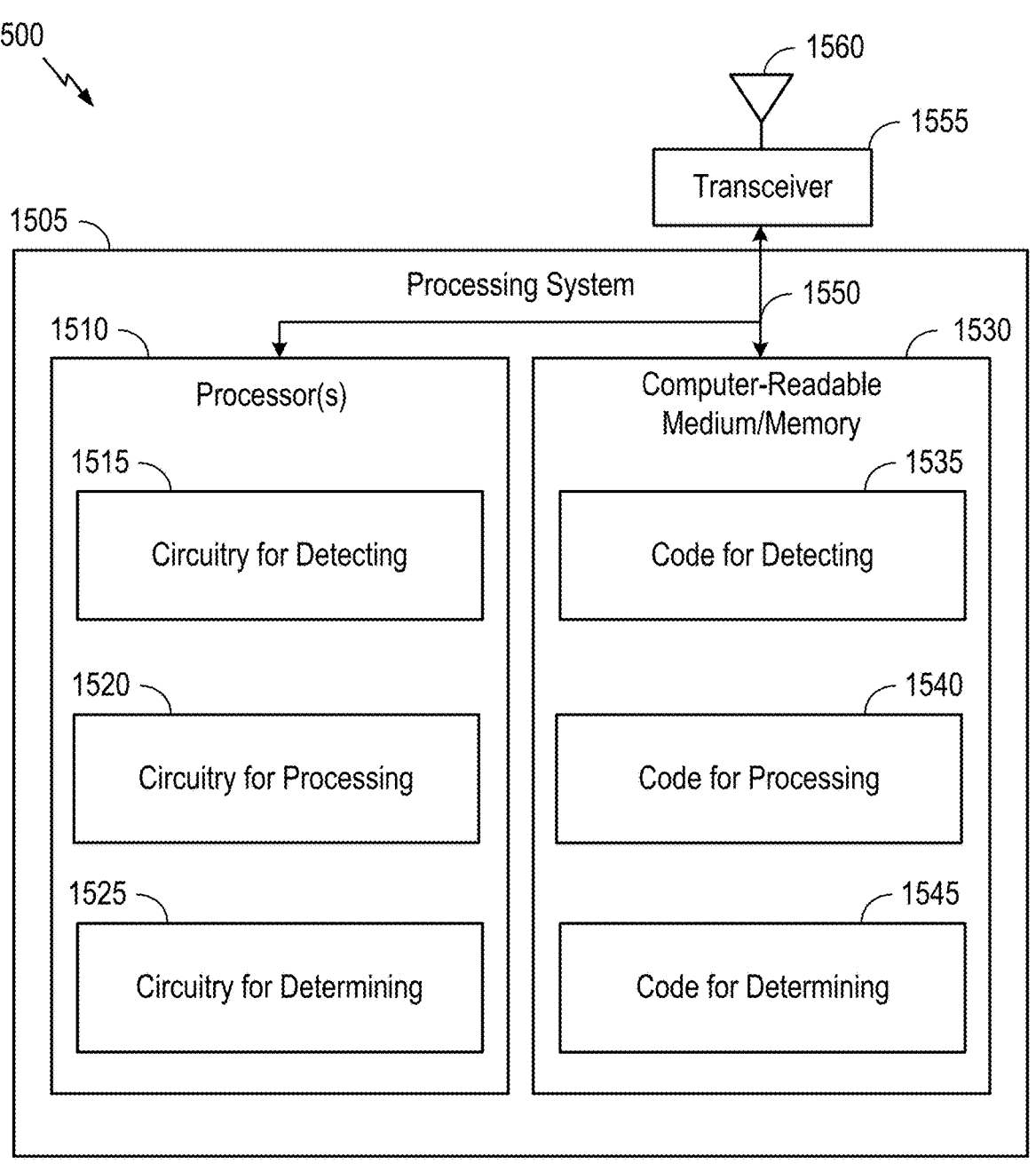
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Example Operations of a Network Entity

Figure 14:
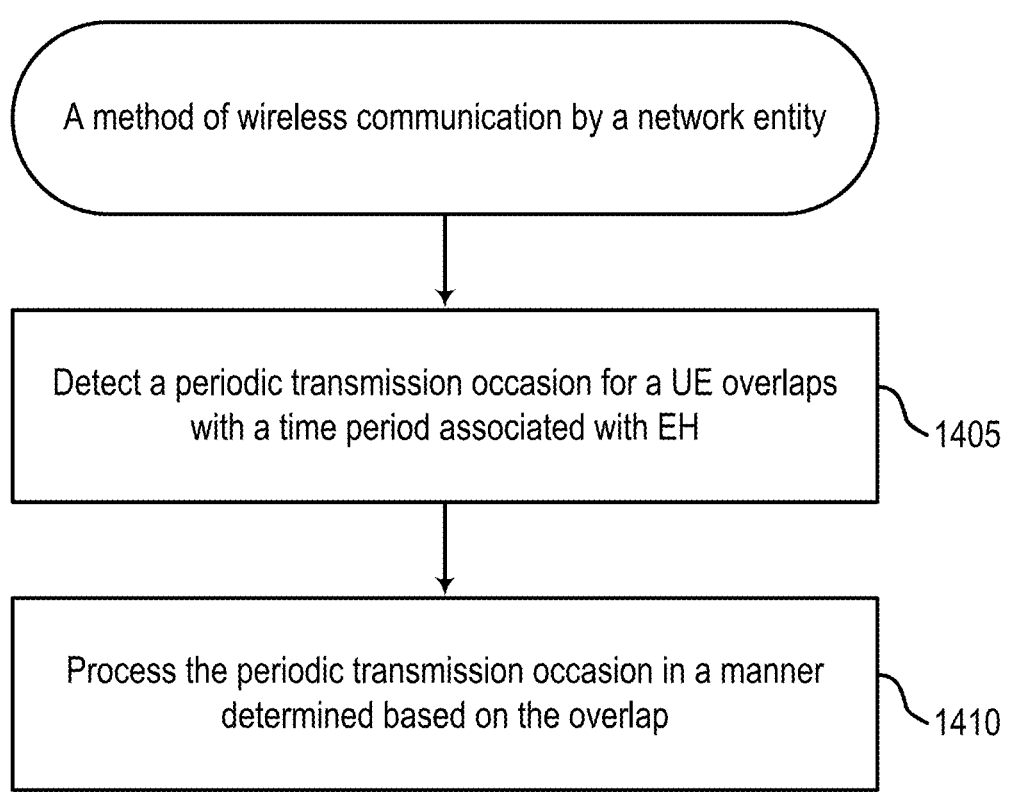
FIG. 14 depicts a method for wireless communications.

FIG. 14 shows an example of a method 1400 of wireless communication by a network entity, such as a BS 102 of FIGS. 1 and 3, or a disaggregated base station as discussed with respect to FIG. 2.

Method 1400 begins at step 1405 with detecting a periodic transmission (e.g., SPS PDSCH) occasion for a UE overlaps with a time period associated with EH. In some cases, the operations of this step refer to, or may be performed by, circuitry for detecting and/or code for detecting as described with reference to FIG. 16.

Method 1400 then proceeds to step 1410 with processing the periodic transmission occasion in a manner determined based on the overlap. In some cases, the operations of this step refer to, or may be performed by, circuitry for processing and/or code for processing as described with reference to FIG. 16.

In some aspects, the time period associated with EH comprises an SPS EH occasion.

In some aspects, processing the SPS PDSCH occasion in a manner determined based on the overlap comprises: transmitting a PDSCH in the SPS PDSCH occasion using a first MCS that is lower than a second MCS used for transmitting a PDSCH in SPS PDSCH occasions that do not overlap with time periods associated with EH.

In some aspects, the method 1400 further includes signaling the UE an indication of the first MCS as an absolute MCS value or an offset MCS value relative to the second MCS. In some cases, the operations of this step refer to, or may be performed by, circuitry for signaling and/or code for signaling as described with reference to FIG. 16.

In some aspects, the time period associated with EH comprises an EH time period scheduled via DCI.

In some aspects, processing the SPS PDSCH occasion in a manner determined based on the overlap comprises transmitting a PDSCH in the SPS PDSCH using a MCS indicated in the DCI.

In some aspects, the method 1400 further includes determining the MCS as a function of an amount of overlap between the SPS PDSCH occasion and the time period associated with EH. In some cases, the operations of this step refer to, or may be performed by, circuitry for determining and/or code for determining as described with reference to FIG. 16.

In some aspects, the time period associated with EH comprises a time period that an EH circuit of the UE is active.

In some aspects, processing the SPS PDSCH occasion in a manner determined based on the overlap comprises: transmitting a PDSCH in the SPS PDSCH occasion with a first MCS when the EH circuit is active that is lower than a second MCS used for transmitting a PDSCH in SPS PDSCH occasions when the EH circuit is not active.

In some aspects, the method 1400 further includes indicating the first MCS and second MCS via a DCI that activates or reactivates SPS. In some cases, the operations of this step refer to, or may be performed by, circuitry for indicating and/or code for indicating as described with reference to FIG. 16.

In some aspects, the method 1400 further includes indicating the first MCS and second MCS via RRC or MAC-CE signaling. In some cases, the operations of this step refer to, or may be performed by, circuitry for indicating and/or code for indicating as described with reference to FIG. 16.

In some aspects, processing the SPS PDSCH occasion in a manner determined based on the overlap comprises refraining from transmitting PDSCH in the SPS PDSCH occasion when the EH circuit is active.

In some aspects, processing the SPS PDSCH occasion in a manner determined based on the overlap comprises transmitting data in a PDSCH or as energy signals in the SPS PDSCH occasion when the EH circuit is active.

Figure 16:
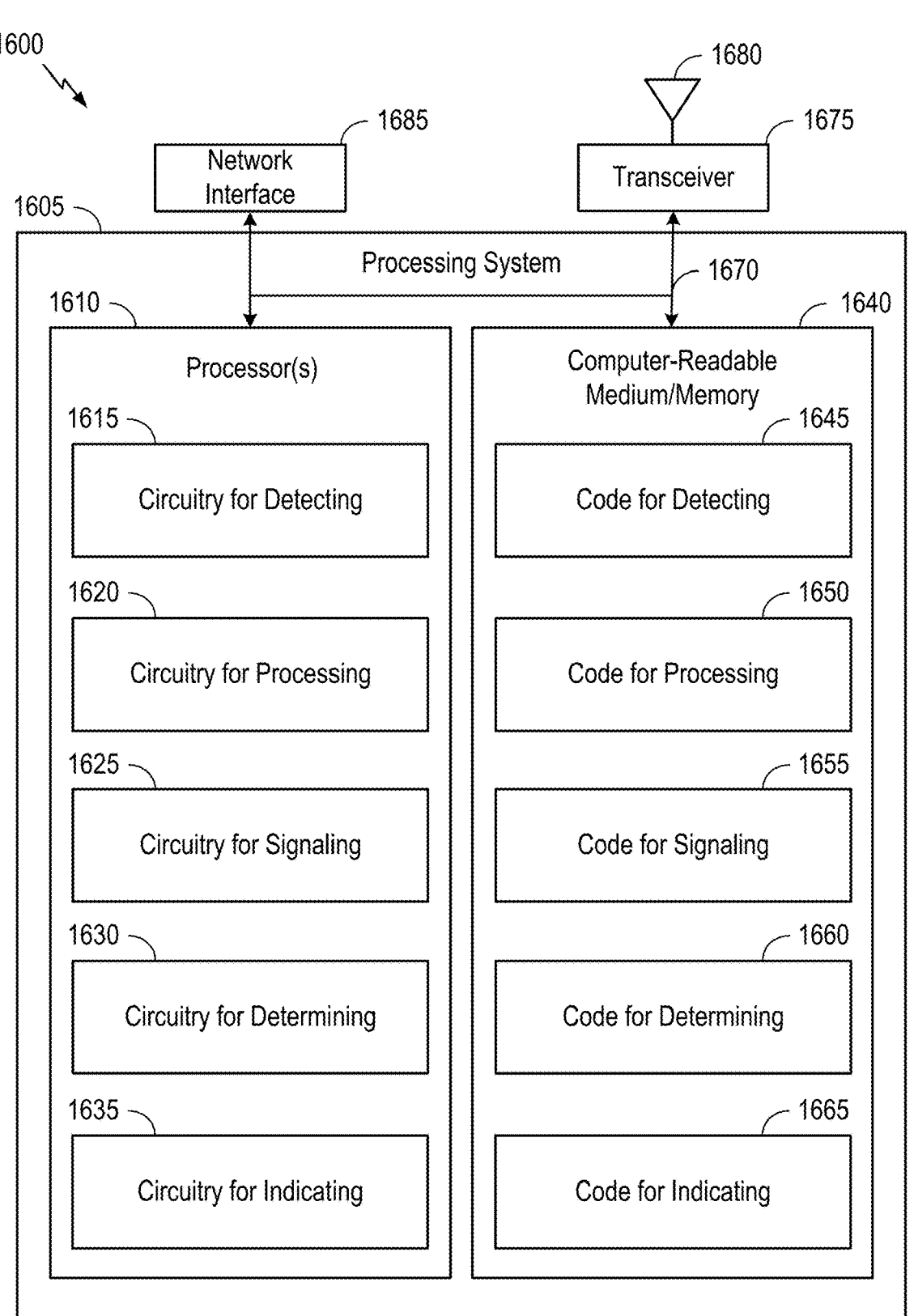
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Example Communications Devices

FIG. 15 depicts aspects of an example communications device 1500. In some aspects, communications device 1500 is a user equipment, such as a UE 104 described above with respect to FIGS. 1 and 3.

The communications device 1500 includes a processing system 1505 coupled to the transceiver 1555 (e.g., a transmitter and/or a receiver). The transceiver 1555 is configured to transmit and receive signals for the communications device 1500 via the antenna 1560, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors

1510 may be representative of one or more of receive processor 358, transmit processor 364, TX MIMO processor 366, and/or controller/processor 380, as described with respect to FIG. 3. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1300 described with respect to FIG. 13, or any aspect related to it. Note that reference to a processor performing a function of communications device 1500 may include one or more processors 1510 performing that function of communications device 1500.

In the depicted example, computer-readable medium/memory 1530 stores code (e.g., executable instructions), such as code for detecting 1535, code for processing 1540, and code for determining 1545. Processing of the code for detecting 1535, code for processing 1540, and code for determining 1545 may cause the communications device 1500 to perform the method 1300 described with respect to FIG. 13, or any aspect related to it.

The one or more processors 1510 include circuitry configured to implement (e.g., execute) the code stored in the computer-readable medium/memory 1530, including circuitry such as circuitry for detecting 1515, circuitry for processing 1520, and circuitry for determining 1525. Processing with circuitry for detecting 1515, circuitry for processing 1520, and circuitry for determining 1525 may cause the communications device 1500 to perform the method 1300 described with respect to FIG. 13, or any aspect related to it.

Various components of the communications device 1500 may provide means for performing the method 1300 described with respect to FIG. 13, or any aspect related to it. For example, means for transmitting, sending or outputting for transmission may include transceivers 354 and/or antenna(s) 352 of the UE 104 illustrated in FIG. 3 and/or the transceiver 1555 and the antenna 1560 of the communications device 1500 in FIG. 15. Means for receiving or obtaining may include transceivers 354 and/or antenna(s) 352 of the UE 104 illustrated in FIG. 3 and/or the transceiver 1555 and the antenna 1560 of the communications device 1500 in FIG. 15.

FIG. 16 depicts aspects of an example communications device 1600. In some aspects, communications device 1600 is a network entity, such as a BS 102 of FIGS. 1 and 3, or a disaggregated base station as discussed with respect to FIG. 2.

The communications device 1600 includes a processing system 1605 coupled to the transceiver 1675 (e.g., a transmitter and/or a receiver) and/or a network interface 1685. The transceiver 1675 is configured to transmit and receive signals for the communications device 1600 via the antenna 1680, such as the various signals as described herein. The network interface 1685 is configured to obtain and send signals for the communications device 1600 via communication link(s), such as a backhaul link, midhaul link, and/or fronthaul link as described herein, such as with respect to FIG. 2. The processing system 1605 may be configured to perform processing functions for the communications device 1600, including processing signals received and/or to be transmitted by the communications device 1600.

The processing system 1605 includes one or more processors 1610. In various aspects, one or more processors 1610 may be representative of one or more of receive processor 338, transmit processor 320, TX MIMO processor 330, and/or controller/processor 340, as described with respect to FIG. 3. The one or more processors 1610 are coupled to a computer-readable medium/memory 1640 via a bus 1670. In certain aspects, the computer-readable medium/memory 1640 is configured to store instructions (e.g., computer-executable code) that when executed by the one or more processors 1610, cause the one or more processors 1610 to perform the method 1400 described with respect to FIG. 14, or any aspect related to it. Note that reference to a processor of communications device 1600 performing a function may include one or more processors 1610 of communications device 1600 performing that function.

In the depicted example, the computer-readable medium/memory 1640 stores code (e.g., executable instructions), such as code for detecting 1645, code for processing 1650, code for signaling 1655, code for determining 1660, and code for indicating 1665. Processing of the code for detecting 1645, code for processing 1650, code for signaling 1655, code for determining 1660, and code for indicating 1665 may cause the communications device 1600 to perform the method 1400 described with respect to FIG. 14, or any aspect related to it.

The one or more processors 1610 include circuitry configured to implement (e.g., execute) the code stored in the computer-readable medium/memory 1640, including circuitry such as circuitry for detecting 1615, circuitry for processing 1620, circuitry for signaling 1625, circuitry for determining 1630, and circuitry for indicating 1635. Processing with circuitry for detecting 1615, circuitry for processing 1620, circuitry for signaling 1625, circuitry for determining 1630, and circuitry for indicating 1635 may cause the communications device 1600 to perform the method 1400 as described with respect to FIG. 14, or any aspect related to it.

Various components of the communications device 1600 may provide means for performing the method 1400 as described with respect to FIG. 14, or any aspect related to it. Means for transmitting, sending or outputting for transmission may include transceivers 332 and/or antenna(s) 334 of the BS 102 illustrated in FIG. 3 and/or the transceiver 1675 and the antenna 1680 of the communications device 1600 in FIG. 16. Means for receiving or obtaining may include transceivers 332 and/or antenna(s) 334 of the BS 102 illustrated in FIG. 3 and/or the transceiver 1675 and the antenna 1680 of the communications device 1600 in FIG. 16.

Example Clauses

Implementation examples are described in the following numbered clauses:

Clause 1: A method of wireless communication by a UE, comprising: detecting a periodic transmission occasion overlaps with a time period associated with EH; and processing the periodic transmission occasion in a manner determined based on the overlap.

Clause 2: The method of Clause 1, wherein the time period associated with EH comprises an SPS EH occasion.

Clause 3: The method of Clause 2, wherein processing the SPS PDSCH occasion in a manner determined based on the overlap comprises: processing the SPS PDSCH occasion with a first MCS that is lower than a second MCS used for processing SPS PDSCH occasions that do not overlap with time periods associated with EH.

Clause 4: The method of Clause 3, further comprising: determining the first MCS based on an absolute MCS value or an offset MCS value relative to the second MCS.

Clause 5: The method of Clause 4, wherein the absolute MCS value or offset MCS value is dynamically signaled or configured via RRC signaling.

Clause 6: The method of Clause 2, wherein the UE discards an EH signal while processing the SPS PDSCH occasion.

Clause 7: The method of Clause 2, wherein the UE processes EH signals: using a first power splitting factor for EH time periods that overlap with SPS PDSCH occasions; and using a second power splitting factor for EH time periods that do not overlap with SPS PDSCH occasions.

Clause 8: The method of any one of Clauses 1-7, wherein the time period associated with EH comprises an EH time period scheduled via DCI.

Clause 9: The method of Clause 8, wherein processing the SPS PDSCH occasion in a manner determined based on the overlap comprises processing the SPS PDSCH with a MCS indicated in the DCI.

Clause 10: The method of Clause 9, wherein the SPS PDSCH occasion is processed using the MCS indicated in the DCI only if there is sufficient time between the DCI and the SPS PDSCH occasion.

Clause 11: The method of Clause 10, wherein the SPS PDSCH occasion is canceled only if the overlap is greater than a threshold amount.

Clause 12: The method of Clause 8, wherein processing the SPS PDSCH occasion in a manner determined based on the overlap comprises canceling the SPS PDSCH occasion.

Clause 13: The method of any one of Clauses 1-12, wherein the time period associated with EH comprises a time period that an EH circuit of the UE is active.

Clause 14: The method of Clause 13, wherein processing the SPS PDSCH occasion in a manner determined based on the overlap comprises: processing the SPS PDSCH with a first MCS when the EH circuit is active that is lower than a second MCS used for processing SPS PDSCH occasions when the EH circuit is not active.

Clause 15: The method of Clause 13, wherein the first MCS and second MCS are indicated via a DCI that activates or reactivates SPS.

Clause 16: The method of Clause 13, wherein the first MCS and second MCS are indicated via RRC or MAC-CE signaling.

Clause 17: The method of Clause 13, wherein processing the SPS PDSCH occasion in a manner determined based on the overlap comprises canceling the SPS PDSCH occasion.

Clause 18: A method of wireless communication by a network entity, comprising: detecting a periodic transmission occasion for a UE overlaps with a time period associated with EH; and processing the periodic transmission occasion in a manner determined based on the overlap.

Clause 19: The method of Clause 18, wherein the time period associated with EH comprises an SPS EH occasion.

Clause 20: The method of Clause 19, wherein processing the SPS PDSCH occasion in a manner determined based on the overlap comprises: transmitting a PDSCH in the SPS PDSCH occasion using a first MCS that is lower than a second MCS used for transmitting a PDSCH in SPS PDSCH occasions that do not overlap with time periods associated with EH.

Clause 21: The method of Clause 20, further comprising: signaling the UE an indication of the first MCS as an absolute MCS value or an offset MCS value relative to the second MCS.

Clause 22: The method of any one of Clauses 18-21, wherein the time period associated with EH comprises an EH time period scheduled via DCI.

Clause 23: The method of Clause 22, wherein processing the SPS PDSCH occasion in a manner determined based on the overlap comprises transmitting a PDSCH in the SPS PDSCH using a MCS indicated in the DCI.

Clause 24: The method of Clause 23, further comprising: determining the MCS as a function of an amount of overlap between the SPS PDSCH occasion and the time period associated with EH.

Clause 25: The method of any one of Clauses 18-24, wherein the time period associated with EH comprises a time period that an EH circuit of the UE is active.

Clause 26: The method of Clause 25, wherein processing the SPS PDSCH occasion in a manner determined based on the overlap comprises: transmitting a PDSCH in the SPS PDSCH occasion with a first MCS when the EH circuit is active that is lower than a second MCS used for transmitting a PDSCH in SPS PDSCH occasions when the EH circuit is not active.

Clause 27: The method of Clause 25, further comprising: indicating the first MCS and second MCS via a DCI that activates or reactivates SPS.

Clause 28: The method of Clause 25, further comprising: indicating the first MCS and second MCS via RRC or MAC-CE signaling.

Clause 29: The method of Clause 25, wherein processing the SPS PDSCH occasion in a manner determined based on the overlap comprises refraining from transmitting PDSCH in the SPS PDSCH occasion when the EH circuit is active.

Clause 30: The method of Clause 25, wherein processing the SPS PDSCH occasion in a manner determined based on the overlap comprises transmitting data in a PDSCH or as energy signals in the SPS PDSCH occasion when the EH circuit is active.

Clause 31: An apparatus, comprising: a memory comprising executable instructions; and a processor configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by a processor of an apparatus, cause the apparatus to perform a method in accordance with any one of Clauses 1-30.

Clause 34: A computer program product embodied on a computer-readable storage medium comprising code for performing a method in accordance with any one of Clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication by a user equipment (UE), the method comprising:

detecting a semi-persistently scheduled (SPS) physical downlink shared channel (PDSCH) transmission occasion overlaps with a time period associated with energy harvesting (EH); and processing the SPS PDSCH transmission occasion in a manner determined based on the overlap, wherein processing the SPS PDSCH transmission occasion in the manner determined based on the overlap comprises:

processing the SPS PDSCH transmission occasion that overlaps with the time period associated with EH using a first set of configuration parameters different than a second set of configuration parameters used for processing SPS PDSCH transmission occasions that do not overlap with the time period associated with EH, processing the SPS PDSCH transmission occasion that overlaps with the time period associated with EH using a first modulation and coding scheme (MCS) that is lower than a second MCS used for processing the SPS PDSCH transmission occasions that do not overlap with time period associated with EH, or processing the SPS PDSCH transmission occasion that overlaps with the time period associated with EH using a first power splitting factor different than a second power splitting factor used for processing the SPS PDSCH transmission occasions that do not overlap with the time period associated with EH.

2. The method of claim 1, wherein the time period associated with EH comprises a SPS EH occasion.

3. The method of claim 1, wherein processing the SPS PDSCH occasion in the manner determined based on the overlap comprises processing the SPS PDSCH occasion with the first set of configuration parameters.

4. The method of claim 3, wherein at least one of the first set of configuration parameters or the second set of configuration parameters comprises at least one of: a modulation and coding scheme (MCS), transmission port, transmission rank, power offset of a data channel demodulation reference signal (DMRS), time-domain resource allocation (TDRA), frequency-domain resource allocation (FDRA), or DMRS configuration.

5. The method of claim 1, wherein processing the SPS PDSCH occasion in the manner determined based on the overlap comprises processing the SPS PDSCH transmission occasion with the first MCS.

6. The method of claim 5, further comprising determining the first MCS based on an absolute MCS value or an offset MCS value relative to the second MCS.

7. The method of claim 6, wherein the absolute MCS value or offset MCS value is dynamically signaled or configured via radio resource control (RRC) signaling.

8. The method of claim 1, wherein processing the SPS PDSCH transmission occasion in the manner determined based on the overlap comprises discarding the EH signal while processing the SPS PDSCH transmission occasion.

9. The method of claim 1, wherein processing the SPS PDSCH transmission occasion in the manner determined based on the overlap comprises processing the SPS PDSCH transmission occasion using the first power splitting factor.

10. The method of claim 1, wherein the time period associated with EH comprises an EH time period scheduled via downlink control information (DCI).

11. The method of claim 10, wherein processing the SPS PDSCH transmission occasion in the manner determined based on the overlap comprises processing the SPS PDSCH transmission occasion with the MCS, and wherein the first MCS is indicated in the DCI.

12. The method of claim 11, wherein the SPS PDSCH transmission occasion is processed using the MCS indicated in the DCI only if there is sufficient time between the DCI and the SPS PDSCH transmission occasion.

13. The method of claim 10, wherein processing the SPS PDSCH transmission occasion in the manner determined based on the overlap comprises canceling the SPS PDSCH transmission occasion.

14. The method of claim 13, wherein the SPS PDSCH transmission occasion is canceled in response to an amount of the overlap being greater than a threshold amount.

15. The method of claim 1 wherein the time period associated with EH comprises a time period that an EH circuit of the UE is active.

16. The method of claim 15, wherein processing the SPS PDSCH transmission occasion in the manner determined based on the overlap comprises processing the SPS PDSCH transmission occasion with the first MCS when the EH circuit is active and processing the SPS PDSCH transmission occasions that do not overlap with the time period associated with EH when the EH circuit is not active.

17. The method of claim 15, wherein the first MCS and second MCS are indicated via a downlink control information (DCI) that activates or reactivates SPS.

18. The method of claim 15, wherein the first MCS and second MCS are indicated via radio resource control (RRC) or medium access control (MAC) control element (CE) signaling.

19. The method of claim 15, wherein processing the SPS PDSCH transmission occasion in the manner determined based on the overlap comprises canceling the SPS PDSCH transmission occasion.

20. A method of wireless communication by a network entity, the method comprising:

detecting a semi-persistently scheduled (SPS) physical downlink shared channel (PDSCH) transmission occasion for a user equipment (UE) overlaps with a time period associated with energy harvesting (EH); and processing the SPS PDSCH transmission occasion in a manner determined based on the overlap, wherein processing the SPS PDSCH transmission occasion in the manner determined based on the overlap comprises:

processing the SPS PDSCH transmission occasion that overlaps with the time period associated with EH using a first set of configuration parameters different than a second set of configuration parameters used for processing SPS PDSCH transmission occasions that do not overlap with the time period associated with EH, processing the SPS PDSCH transmission occasion that overlaps with the time period associated with EH using a first modulation and coding scheme (MCS) that is lower than a second MCS used for processing the SPS PDSCH transmission occasions that do not overlap with time period associated with EH, or processing the SPS PDSCH transmission occasion that overlaps with the time period associated with EH using a first power splitting factor different than a second power splitting factor used for processing the SPS PDSCH transmission occasions that do not overlap with the time period associated with EH.

21. The method of claim 20, wherein the time period associated with EH comprises a SPS EH occasion.

22. The method of claim 20, wherein processing the SPS PDSCH transmission occasion in the manner determined based on the overlap comprises processing the SPS PDSCH transmission occasion with the first set of configuration parameters.

23. The method of claim 22, wherein at least one of the first set of configuration parameters or the second set of configuration parameters comprises at least one of: a modulation and coding scheme (MCS), transmission port, transmission rank, power offset of a data channel demodulation reference signal (DMRS), time-domain resource allocation (TDRA), frequency-domain resource allocation (FDRA), or DMRS configuration.

24. The method of claim 20, wherein processing the SPS PDSCH transmission occasion in the manner determined based on the overlap comprises transmitting a PDSCH in the SPS PDSCH transmission occasion using the first MCS.

25. The method of claim 24, further comprising signaling the UE an indication of the first MCS as an absolute MCS value or an offset MCS value relative to the second MCS.

26. The method of claim 20, wherein the time period associated with EH comprises an EH time period scheduled via downlink control information (DCI).

27. A user equipment (UE) configured for wireless communication, the UE comprising:

a memory comprising processor-executable instructions; and one or more processors configured to execute the processor-executable instructions and cause the UE to:

detect a semi-persistently scheduled (SPS) physical downlink shared channel (PDSCH) transmission occasion overlaps with a time period associated with energy harvesting (EH); and process the SPS PDSCH transmission occasion in a manner determined based on the overlap, wherein processing the SPS PDSCH transmission occasion in the manner determined based on the overlap comprises:

processing the SPS PDSCH transmission occasion that overlaps with the time period associated with EH using a first set of configuration parameters different than a second set of configuration parameters used for processing SPS PDSCH transmission occasions that do not overlap with the time period associated with EH, processing the SPS PDSCH transmission occasion that overlaps with the time period associated with EH using a first modulation and coding scheme (MCS) that is lower than a second MCS used for processing the SPS PDSCH transmission occasions that do not overlap with time period associated with EH, or processing the SPS PDSCH transmission occasion that overlaps with the time period associated with EH using a first power splitting factor different than a second power splitting factor used for processing the SPS PDSCH transmission occasions that do not overlap with the time period associated with EH.

28. A network entity configured for wireless communication, the network entity comprising:

a memory comprising processor-executable instructions; and one or more processors configured to execute the processor-executable instructions and cause the network entity to:

detect a semi-persistently scheduled (SPS) physical downlink shared channel (PDSCH) transmission occasion for a user equipment (UE) overlaps with a time period associated with energy harvesting (EH); and process the SPS PDSCH transmission in a manner determined based on the overlap, wherein processing the SPS PDSCH transmission occasion in the manner determined based on the overlap comprises:

processing the SPS PDSCH transmission occasion that overlaps with the time period associated with EH using a first set of configuration parameters different than a second set of configuration parameters used for processing SPS PDSCH transmission occasions that do not overlap with the time period associated with EH, processing the SPS PDSCH transmission occasion that overlaps with the time period associated with EH using a first modulation and coding scheme (MCS) that is lower than a second MCS used for processing the SPS PDSCH transmission occasions that do not overlap with time period associated with EH, or processing the SPS PDSCH transmission occasion that overlaps with the time period associated with EH using a first power splitting factor different than a second power splitting factor used for processing the SPS PDSCH transmission occasions that do not overlap with the time period associated with EH.

* * * * *